(12) United States Patent
Riddle et al.

(10) Patent No.: US 6,259,430 B1
(45) Date of Patent: Jul. 10, 2001

(54) COLOR DISPLAY

(75) Inventors: George Herbert Needham Riddle, Princeton; Herschel Clement Burstyn, Lawrenceville, both of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/602,315

(22) Filed: Jun. 23, 2000

Related U.S. Application Data

(60) Provisional application No. 60/141,193, filed on Jun. 25, 1999, and provisional application No. 60/152,056, filed on Sep. 2, 1999.

(51) Int. Cl.[7] .................................................. G09G 5/02
(52) U.S. Cl. .............................. 345/150; 353/31; 353/34
(58) Field of Search ..................................... 345/204, 150, 345/151, 153, 154; 353/31, 34; 349/8

(56) References Cited

U.S. PATENT DOCUMENTS

| | | |
|---|---|---|
| 4,366,407 | 12/1982 | Walsh . |
| 4,800,375 * | 1/1989 | Silverstein et al. . |
| 5,321,448 * | 6/1994 | Ogawa ..................................... 353/34 |
| 5,517,263 * | 5/1996 | Minich et al. .......................... 353/31 |
| 5,626,409 * | 5/1997 | Nakayama et al. ..................... 353/31 |
| 5,806,950 * | 9/1998 | Gale ........................................ 353/31 |
| 5,917,561 * | 6/1999 | Hatanaka ................................. 349/8 |

FOREIGN PATENT DOCUMENTS

| | | |
|---|---|---|
| 0 843 487 A1 | 5/1998 | (EP) . |
| 2 282 928 | 4/1995 | (GB) . |
| 8-272316 | 10/1996 | (JP) . |

OTHER PUBLICATIONS

International Search Report for PCT/US00/17438, filed Jun. 26, 2000. "Liquid Crystal Display Three Panel Projector Using Three Primary Colors Light Emitting Diode Light Sources" IBM Technical Disclosure Bulletin, US, IBM Corp. New York, vol. 40, No. 4, Apr. 1, 1997, pp. 201–205, XP000728313 ISSN.: 0018–8689, the whole document.

* cited by examiner

*Primary Examiner*—Kent Chang
(74) *Attorney, Agent, or Firm*—William J. Burke

(57) ABSTRACT

A color display system comprises a radiation generator in which the intensity of at least four wavelength bands can be controlled to reproduce a desired color. The system includes an intensity modulator that generates a multiplicity of modulation control signals each corresponding to a respectively different one of the wavelength bands. A multi-wavelength radiation source provides a plurality of narrow-band radiation signals, each corresponding to a respectively different one of the wavelength bands. The radiation source is responsive to the control signals to control the intensity of each of the narrow-band radiation signals to provide a plurality of modulated narrow-band radiation signals. The plurality of narrow-band radiation signals are combined to reproduce the desired color.

21 Claims, 3 Drawing Sheets

COLOR DISPLAY

CROSS-REFERENCE TO RELATED APPLICATIONS

This application claims priority of U.S. Provisional Application 60/141,193, filed Jun. 25, 1999, and on U.S. Provisional Application 60/152,056, filed Sep. 2, 1999, each of which is incorporated herein by reference.

FIELD OF THE INVENTION

This invention relates to a color display and to a method for displaying color. In particular, this invention relates to device for the production and communication of color in which improved color specification is achieved by providing independent control of the radiation intensity within at least four bands across the visible spectrum.

BACKGROUND OF THE INVENTION

A wide gamut of colors can be generated and displayed by intermixing red, green, and blue primary light sources in different ratios. In general, a color that matches any particular color sample can be produced on a display using the three primary colors.

However, the ratios of the red, green, and blue primaries that produce a color that matches any particular sample depend on the ambient light used to illuminate the color sample. Moreover, when only the three primary colors are used, it is possible to produce a color that some people see as a match to a sample, but that other people see as a mismatch. Colors that look alike in some ambient illuminations look different in other illuminations, and colors that look alike to some people look different to others. These phenomena are referred to as "metamerism".

Appearance of the color under given illumination depends on both the reflectance spectrum and the illuminance spectrum. Consequently, reproduction of the appearance of a color sample requires knowledge of both the complete reflectance spectrum and the complete illuminance spectrum. When these are known, the color can be reproduced by generating the spectrum that is the convolution of these two.

Perfect reproduction of a color requires control over the intensity level of each wavelength of the visible spectrum. In practice, the spectrum can be divided into a plurality of bands, and the average intensity within each band can be specified. Using four or five such bands results in significantly reduced metamerism, compared with the commonly used three primary colors. Using seven bands reduces the metameric effects by an order of magnitude. Therefore, a need exists for a system for specifying, measuring, displaying, and communicating colors with reduced metameric confusion.

SUMMARY OF THE INVENTION

The invention is a method for displaying color. The displayed color has reduced metameric confusion as compared to colors obtained by mixing radiation from the three primary colors. The improved color specification is achieved by providing independent control of the intensity of radiation within at least four bands across the spectrum. In general, the metameric improvement is greater with a larger number of bands. Preferably, at least seven bands of radiation are used. The method comprises the steps of:
a) providing a radiation spectrum of the color;
b) dividing the radiation spectrum into at least four wavelength bands;
c) selecting a wavelength in each of the wavelength bands;
d) determining an intensity for each selected wavelength;
e) transmitting the intensities to a radiation source;
f) generating a multiplicity of beams of radiation, each beam of radiation essentially corresponding in wavelength and intensity to the wavelength and intensity of one of the selected wavelengths; and
g) combining the beams of radiation and displaying the color.

In another embodiment, the invention is a color display. The color display comprises:
a radiation source capable of producing at least four beams of radiation, each beam having a respectively different wavelength;
means for controlling the intensity of each of the beams of radiation; and
a display device.

In a preferred embodiment, the color display also comprises a feedback control means that samples the intensity and/or wavelength of each of the beams of radiation and provides feedback control of the displayed color.

DETAILED DESCRIPTION OF THE INVENTION

The invention is a color system that can display colors by projecting radiation onto a display device and a method for transmitting and displaying a color. The projected radiation is defined by the intensity of each of a multiplicity of radiation bands, each band of which has a respectively different wavelength. At least four beams of radiation are used to display a particular color. The intensity of radiation within each beam can be varied to produce any desired spectrum within the resolution of the bands used to display the color. All operations are preferably under digital control.

Figure 1:
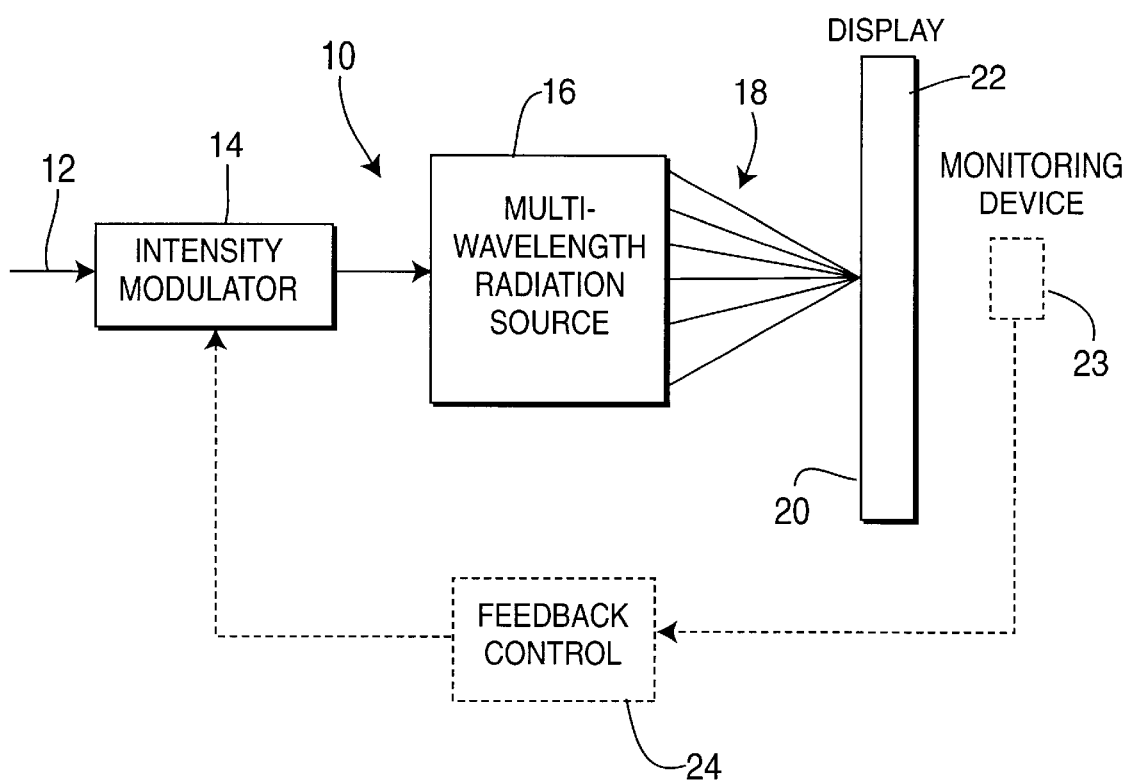
FIG. 1 is a schematic representation of the color display of the invention.

FIG. 1 is a schematic representation of a color display system according to the present invention. Color display system 10 receives input signals 12 to an intensity modulator 14. The modulator 14 controls the intensity of each selected wavelength of each beam of radiation generated by the multi-wavelength radiation source 16. Exemplary apparatus suitable for use as the modulator 14 is described below with reference to FIGS. 4 and 5. Beams of radiation 18 are combined and displayed by display device 20, which may comprise a screen 22. Also shown are optional monitoring device 23 and feedback control means 24, that may be used to provide improved control of the radiation intensity in the radiation beams.

As a first step in the process, the radiation spectrum of an object is determined. The radiation spectrum contains information about the intensity of radiation coming from the object, i.e., reflected by and/or emitted from the object, as a function of wavelength. In the exemplary embodiment the radiation is visible radiation but it is contemplated that the principles of the present invention may be applied to mixing other types of radiation such as ultraviolet or infra-red. The object can be a source of radiation, such as a fluorescent lamp. Typically, however, the radiation is reflected by the object, and the object has a color or a colored coating.

The radiation spectrum may determined by illuminating the object with an illumination source and measuring the fraction of the reflected radiation as a function of wavelength. The illumination source may be a natural source, such as the sun, or it may be an artificial source, such as an incandescent lamp, fluorescent lamp, sodium vapor lamp, mercury vapor lamp, xenon lamp, etc. The illumination source provides a view of how a particular object appears under various conditions of illumination. If desired, a set of illumination sources and filters can be used to generate a variety of illumination conditions.

The radiation spectrum can be determined by methods well-known to those skilled in the art (see, for example, "Standard practice for Obtaining Spectrophotometric Data for Object-Color Evaluation," ASTM Designation E 1164 (83), American Society for Testing Materials, Philadelphia, Pa.). For example, a spectrometer, in cooperation with a computer, can also be used to measure the radiation spectra of objects under known conditions of illumination. The optics used to illuminate the object and sense the reflected radiation may comprise a fiber-optic probe. The spectrometer can also be used to measure the spectra of the radiation from the illumination source. The optics for measurement may also include a fiber-optic probe.

Alternatively, the reflectance spectrum of the object (i.e., amount of radiation reflected by the object as a function of wavelength) can be determined and stored in a computer. As another alternative, the spectrum (i.e., radiation intensity as a function of wavelength) may be measured and stored in the computer. The computer can then calculate the intensity of the radiation reflected by the object as a function of wavelength when the object is irradiated with a particular illumination source. By this method the intensity of the radiation reflected by the object as function of wavelength, i.e., the radiation spectrum of the object, can be calculated for a number of different illumination sources and displayed on the color display, making it unnecessary to measure the radiation spectrum of the object under different illumination conditions.

The radiation spectrum for an object may used directly to provide input to the color display from the measuring device or, once determined, it may be stored electronically, such as in a computer or other electronic storage device, and used when desired. Alternatively, the reflectance spectrum of the object and spectra of various illumination sources can be stored electronically, such as in a computer or other electronic storage device, and the radiation spectrum calculated and used when desired.

Many dyes and pigments derive some of their color from fluorescent effects resulting from illumination by ultraviolet radiation, and conversion of this ultraviolet radiation to visible. In these cases, the radiation spectrum comprises emitted radiation in addition to reflected radiation. To accommodate and measure these effects within the color display when the object comprises a fluorescent dye and/or pigment, it may be desirable to illuminate the object with radiation comprising ultraviolet radiation (i.e., radiation with a wavelength of about 300 nm to about 400 nm) in addition to visible radiation and to measure the radiation spectrum. Sunlight, for example, comprises ultraviolet radiation. Typically, it is not necessary to measure the radiation reflected in ultraviolet wavelength range because ultraviolet radiation is not detected by the human eye and, thus, does not contribute to the perceived color.

The measured radiation spectrum or a new spectrum specified by the user is divided into at least four wavelength bands, preferably at least five bands, more preferably at least seven bands, and even more preferably at least eight bands. Five wavelength bands significantly reduce metamerism and seven bands reduce the metameric effects by an order of magnitude relative to the commonly used three primary colors. Greater reduction in metamerism can be achieved by the use of a larger number of bands, such as ten bands. The radiation spectrum may be conveniently divided by a computer programmed to divide the radiation spectrum into wavelength bands.

The wavelength bands may be formed by dividing the visible spectrum into bands of equal width. Thus, when the visible spectrum is divided into eight wavelength bands, each band has a bandwidth of approximately 37.5 nm. That is to say, each band spans wavelengths having a difference between longest wavelength and shortest wavelength of approximately 37.5 nm. Alternatively, the bands may be of unequal width. For example, narrower bands may be provided in regions of the spectrum where the human eye tends to be more sensitive to differences in wavelength. Thus, relatively wide bands might be used in the red region of the spectrum and narrower bands in the yellow and green region of the spectrum.

Figure 2:
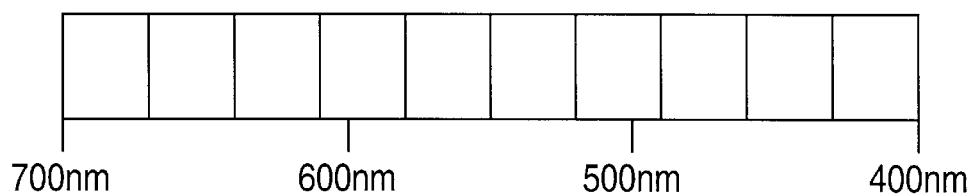
FIG. 2 shows a set of bands selected from the visible spectrum.
Figure 3A:
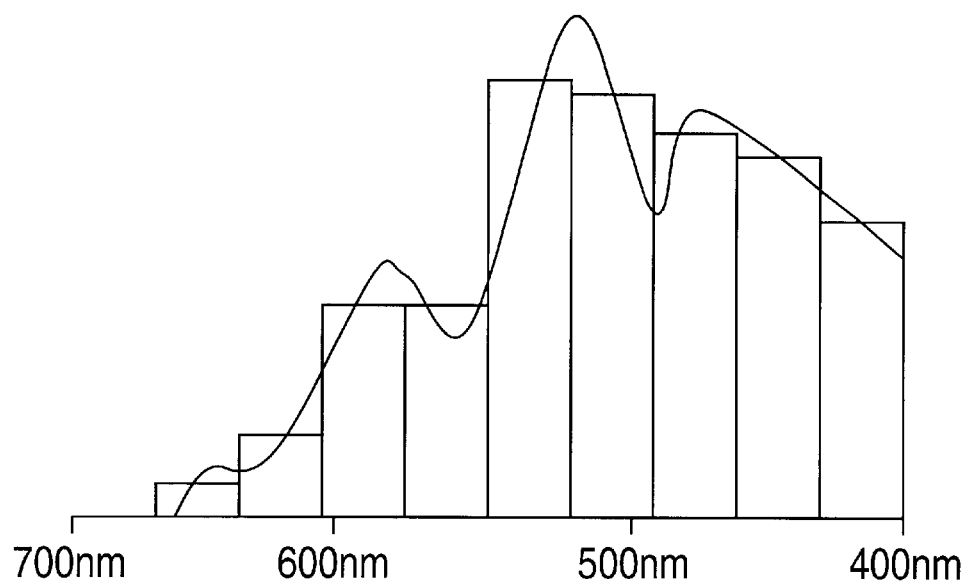
FIG. 3A shows analysis of a color by adjusting the average emission of each band.

The visible spectrum lies between about 400 nm and about 700 nm, and corresponds to colors from violet to red. FIG. 2 shows the visible spectrum divided into ten bands of equal width. Any particular color, for example one represented by the radiation spectrum of FIG. 3A, may be created by adjusting the relative strengths of the average intensity within each band, as approximately indicated by the height of the color bars in FIG. 3A.

Figure 3B:
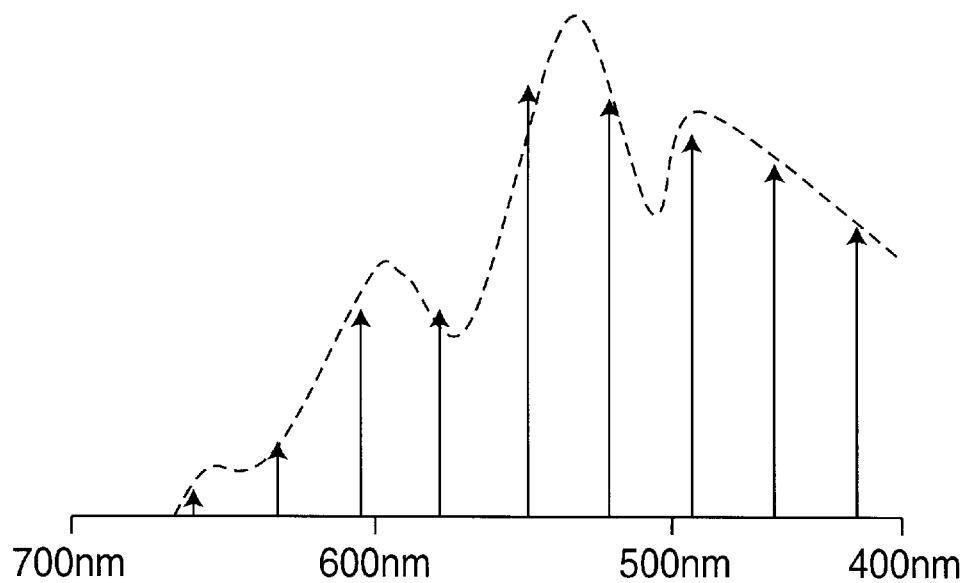
FIG. 3B shows the generation of a color by adjusting the amplitude of discrete, narrow-band radiation sources.

The color display receives input signals 12 that describe the color to be displayed in terms of the average intensity in each of the plurality of bands. After the measured radiation spectrum has been divided into at least four wavelength bands, a wavelength is selected in each band. Typically a wavelength at or near the center of the wavelength band is selected, as shown in FIG. 3B. The intensity of radiation to be displayed at this wavelength is transmitted to the radiation source of the color display.

The intensity of radiation to be displayed may be determined in several different ways. The intensity of the selected wavelength may be transmitted as the intensity of radiation to be displayed. Alternatively, an average intensity may be calculated. The average may be the average intensity of the band, or it may be calculated giving greater weight to the wavelengths at the center of the bands by, for example, using a Gaussian distribution.

Input signals 12, comprising information about the intensity of radiation to be displayed at each selected wavelength, are transmitted to the color display system 10. Input signals 12 preferably are transmitted by digital means, such as by those means typically used for conventional data communication. Encryption can be used if desired.

The exemplary radiation source 16 generates at least four beams of radiation. Radiation source 16 may comprise a single radiation generator that produces the radiation for all the bands. Alternatively, the radiation source 16 may comprise multiple radiation generators, in which each generator produces the radiation for a single band. As another alternative, the radiation source may comprise multiple radiation generators in which one or more generators produce the radiation for respective single bands and one or more generators produce the radiation for multiple bands. Radiation source 16 also comprises the means for controlling the intensity of each radiation band.

Typically, the selected wavelengths are predetermined and radiation source 16 is preadjusted to produce a beam for each of the selected wavelengths. Thus the intensity of each band is controlled, but not the wavelength.

In one embodiment, radiation source 16 comprises a single radiation generator that provides broadband visible light, such as for example, an incandescent lamp or a high pressure mercury-xenon lamp. The light is split into a multiplicity of beams by, for example, a series of partially reflective mirrors. Each beam is directed through a filter that passes light within one of the selected spectral bands to produce a multiplicity of beams, each of which contains a wavelength or wavelengths corresponding to one of the wavelength bands. Alternatively, the light is directed in parallel through several filters, for example, color-selective etalon filters. A portion of the beam passes through each filter to produce the multiplicity of beams 18.

Each beam may be attenuated by a means for controlling its intensity, e.g. by a LCD device under computer control. The filters can be mounted on a single monolithic device such as a liquid crystal display. Alternatively, the filters may each comprise a micro-electro-mechanical system (MEMS) diffraction grating of adjustable amplitude.

Figure 4:
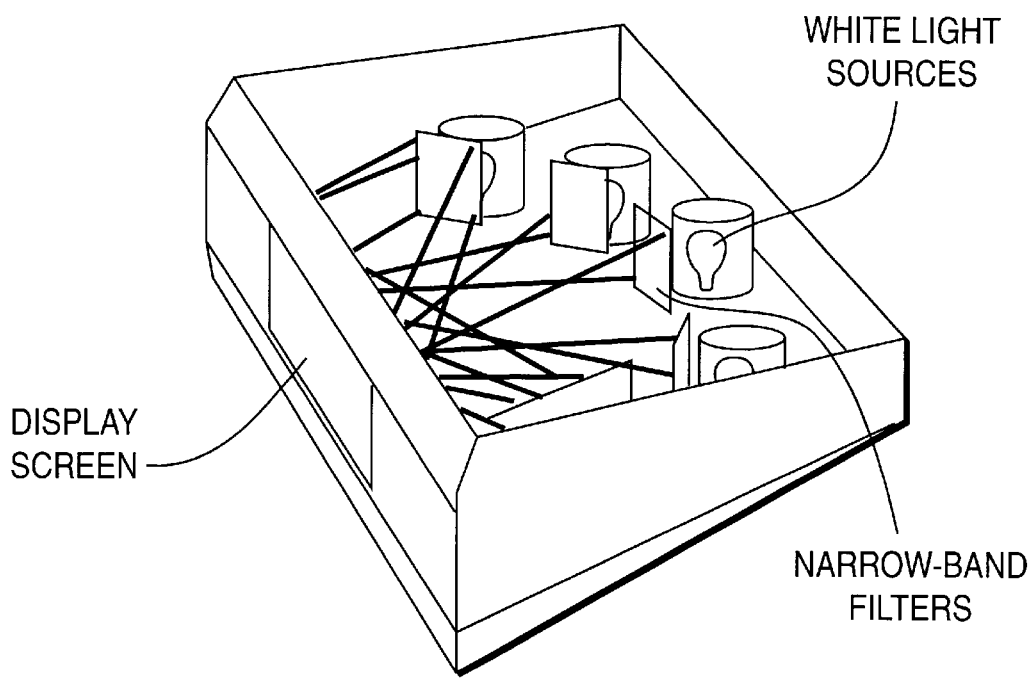
FIG. 4 shows a color display of the invention comprising a multiplicity of lamps and filters.

In another embodiment, the radiation source comprises a multiplicity of lamps and filters. Each lamp/filter combination produces a beam that contains a wavelength or wavelengths corresponding to one of the wavelength bands. FIG. 4 shows a color display comprising a multiplicity of lamps and filters.

When a multiplicity of lamps is used as the radiation source, the intensity each lamp can be controlled, for example, by adjusting the current to the lamp, or by using a variable reflector or attenuator such as a liquid crystal (LC) or micro-electro-mechanical systems (MEMS) device interposed between the lamp and the display device. The intensity of each wavelength band is preferably controlled by an automated controller, such as by a computer controlled liquid crystal (LC) or MEMS device interposed between the lamp and the display device. Intensity may be controlled by limiting the steady-state light transmitted through the device or by pulse-width modulation (PWM) of the device to control the average light transmitted through the device in a predetermined time interval or by a combination of these methods.

Optical devices such as mirrors, gratings, lenses, and fiber waveguides and bundles may be used to combine and display the radiation beams by creating a uniform illumination on the display device.

In another embodiment, radiation source 16 comprises a multiplicity of light emitting diodes (LEDs), each of which emits at characteristic visible wavelength that is substantially constant. Each LED emits at a wavelength corresponding to one of the wavelength bands. The radiation source comprises an LED corresponding to each wavelength band. The wavelength of the each LED essentially corresponds to a respective one of the wavelengths transmitted to the intensity modulator 14. Alternatively, if the average intensity of the wavelength band may be transmitted to the radiation source, the wavelength of the LED is typically at or near the center of the wavelength band. If a particularly narrow wavelength band and/or a particularly high intensity source is desired, lasers, such as semiconductor lasers, may be used in place of LEDs.

Because, the light intensity provided by an LED or other light source may vary with use, monitoring and feedback of the intensity of each light source may be desirable. If it is desired to provide additional control over the wavelength, a wavelength-specific filter such as a dichroic filter may be interposed between one or more of the LEDs. The combination of LED light sources with filters, particularly dichroic filters, can provide narrow-band light sources with wavelengths slightly offset from the central wavelengths of the LEDs alone.

A very slight shift in wavelength of an LED can occur as a result of heating of the LED junction by the current driven through the LED. This shift may be estimated with good accuracy by measuring the voltage drop across the LED junction at a given level of current. If it is desired to retain a high level of precision in color rendition, this shift can be accommodated by adjusting the relative intensities of the different LEDs in order to retain the desired color.

LEDs have several advantages over filtered broadband radiation. These include the elimination of separate light filters (which can be costly), higher efficiency (because none of the light is lost in filters), and lower cost (due to elimination of filters, simplification and reduced capacity requirement of the power supply, and the inherent low cost of LED devices). In addition, LEDs are highly stable so that the wavelength does not need to be continuously monitored by a spectrophotometer. A separate spectrophotometer instrument can be used for occasional calibration.

Radiation source 16 may also comprise a combination of types of radiation generators. For example, LED light sources can be used in combination with other light sources. The radiation source may comprise one or more LEDs that generate one or more of the wavelength bands, and one or more incandescent lamp with appropriate filters that generate the remaining wavelength band or bands.

Radiation beams 18 are combined and displayed by display device 20. Display device 20 may comprise, for example, display screen 22. The radiation beams can be projected onto either the front or the back of the screen of a display device.

The display device may comprise, for example, a beaded screen onto the front of which the radiation beams are projected. Alternatively, the radiation beams can be projected onto the back of a screen comprising a sheet of transparent material, such as clear glass or a clear plastic such as polycarbonate or polymethyl methacrylate, or a translucent material, such as a translucent glass or plastic. Alternatively, the screen can be fabricated of a textured material so as to give the appearance of texture as well as color.

Figure 5:
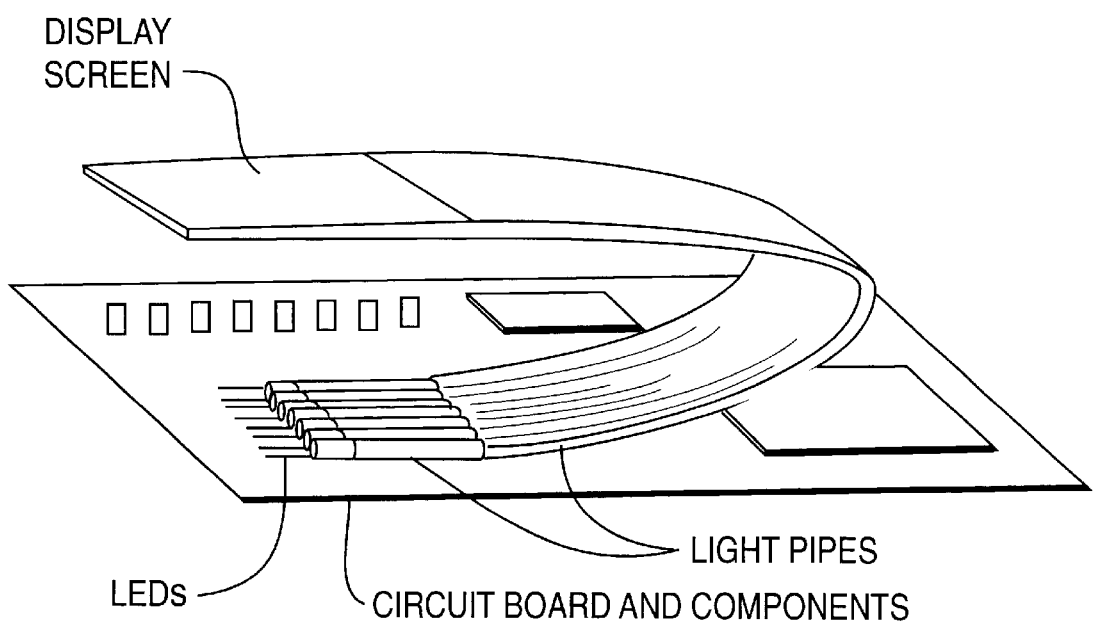
FIG. 5 shows a color display of the invention comprising a multiplicity of LEDs.

Alternatively, the display device may be, for example, a light pipe comprising a set of diffusers to spread the radiation uniformly across the display surface. Light from the LED sources can be directed into light pipes. These pipes can combine the light into a single light pipe, which can carry it to a surface for display. This surface serves as a display screen for the display device. Use of the light pipe simplifies the color display structure, eliminating the need for separate lenses and projection surfaces. With the LED/light pipe combination, the color display structure can be reduced in size, enabling a handheld rather than desk mounted device. Mounting of LEDs, light pipes, and display screens is shown in FIG. 5.

In yet another embodiment, the display device is a light pipe, such as an optical fiber, or a multiplicity of light pipes, with the surface treated so as to emit a fraction of the radiation through the light pipe wall. Such treatments are well known to those skilled in the art, and can include, for example, etching or scribing the surface or embedding reflective or diffractive particles in the light pipe. The light pipe or pipes can be wound into a flat surface, for example in the shape of a disk, or can be woven into a flat fabric. Thus, the surface becomes the screen, emitting the radiation fed into one or both ends of the light pipe or light pipes by the radiation source.

In another embodiment, the display device comprises an imaging means. The imaging means can be a transmissive display positioned in front of the screen or a reflective display positioned in front of the radiation source. The reflective or transmissive display can be a liquid crystal display. Alternatively, the imaging means can be a scanned light spot, wherein the light is produced as described above but focused to a point rather than spread uniformly across a surface, and wherein the intensity of each component is modulated as the spot is scanned, for example in a raster, to produce an image that includes the desired color. The scanning means can include of one or more moving mirrors or micromirrors. Moreover the color can be modulated as the light is scanned to produce an image with multiple colors formed using multiple primaries (preferably at least four).

The device may also comprise feedback control means 24. The radiation at display device 20 may be sampled by a light sensor or a spectrometer connected to a control computer. If desired, the wavelength and/or intensity of each beam can be sampled, for example, by briefly energizing and sensing one beam at a time. This sampling provides feedback and provides improved control of the radiation intensity in the different radiation beams, to more precisely provide the desired spectrum at the display device. The spectrometer sampling may also utilize optics including mirrors, lenses, gratings, and fiber optics.

Although the device and method have been generally described with respect to visible radiation, they can also be used for the display of other wavelengths such as infra-red (wavelengths greater than 700 nm) or ultraviolet radiation (wavelength about 300 nm to about 400 nm) or both ultraviolet and visible radiation (wavelength range about 300 nm to about 700 nm). If radiation generator is needed that produces ultraviolet radiation or radiation in both the ultraviolet and visible regions of the spectrum, a high-pressure mercury-xenon lamp may be used.

The display may also be used to transmit and display wavelengths in other regions of the spectrum, such as below about 300 nm. However, as is well known to those skilled in the art, generation and display of wavelengths in other regions of the spectrum may require the use of special materials because many commonly used optical materials absorb radiation in wavelength ranges outside the range of 300 nm to 700 nm.

INDUSTRIAL APPLICABILITY

The invention provides a method and device for specifying, measuring, displaying, and communicating colors with reduced metameric confusion. The device can measure the spectra of color samples and of illuminators, display colors of specified spectra, produce illumination with a specified spectra for observing color samples, and communicate with similar systems to enable similar display and measurement at remote sites. The user can alter the displayed color to produce a new color to his liking. The computer used for control can also be used communicate with remote sites and to control the display of colors on similar display apparatus at remote sites, and to enable the control of the locally displayed spectrum from remote sites.

The color display may comprise a connection to a distributed computer network, such as the internet. The communications can be encoded to prevent unauthorized interception. The communications can be to and from one or more central servers that receive radiation spectra, provide storage of spectra, and transmit spectra to specific or to general authorized users. That is, a radiation spectrum provider, such as a supplier of paints or other colored finishes, can specify that his spectrum is available only to specific users, such as specified customers, or can be generally available to any user that requests it. A fee can be charged for the reception, storage, and transmission of radiation spectra.

Alternatively, the server can contain a library of spectra of illumination sources and software for calculating a radiation spectrum from a reflectance spectrum. The user supplies the server with the reflectance spectrum, such as the reflectance spectrum of a proposed automotive finish. The server calculates the radiation spectrum for the proposed finish under different light sources, such as sunlight, incandescent light, fluorescent light, sodium vapor light, etc. The server then calculates input signals for the color display and transmits it to the color display. The color display then displays the color as it appears under different types of illumination. In a commercial embodiment, the input signals for a large number of finishes under several different light sources may be predetermined and stored as descriptors. Each descriptor representing the input signals for a respective color in a respective finish when viewed under a respective light source. A customer may select a color finish and light source and have the resulting color displayed, either as a single color or as a portion of a scanned full-color image. This may be especially useful in cases in which it is desired to match the appearance of a color under a number of different types of illumination, such as, for example, in the automotive refinish business. This service can be provided for a fee.

Although the invention has been particularly shown and described with reference to certain preferred embodiments, those skilled in the art will appreciate that various modifications and changes in form and details may be made without departing from the scope of the invention.

For example, in the preceding description specific details are set forth to provide a more thorough understanding of the invention, but it will be apparent to those skilled in the art that the invention may be practiced without using these specific details.

Having described the invention, we now claim the following and their equivalents.

What is claimed is:

1. A method for displaying a color, the method comprising the steps of:
   a) providing a radiation spectrum of the color;
   b) dividing the radiation spectrum into at least four wavelength bands;
   c) determining an intensity for each wavelength band corresponding to the provided spectrum;
   d) transmitting the intensities to a radiation source;
   e) selecting a narrow band of wavelengths in each of the wavelength bands;
   f) generating a multiplicity of beams of radiation, each beam of radiation essentially corresponding in wavelength to a respective one of the selected narrow bands of wavelengths and corresponding in intensity to a respective one of the wavelength bands; and g) combining the beams of radiation to display the color.

2. A method according to claim 1 in which the radiation spectrum is between about 400 nm and about 700 nm.

3. A method according to claim 2 in which the radiation spectrum is divided into at least seven wavelength bands.

4. A method according to claim 2 in which each selected wavelength is at or near the center of its respective wavelength band.

5. A method according to claim 1, further including the steps of:

h) focusing the combined beams into a spot; and i) scanning the spot, while changing the intensity of the beams of radiation to produce a color image.

6. A method according to claim 1, wherein the step of scanning the spot while changing the intensity of the beams of radiation, includes the step of changing the relative intensity of the beams of radiation to produce a multi-color image.

7. Apparatus for displaying a color comprising:

means for receiving an input signal representing respective intensities of a multiplicity of wavelength bands;

an intensity modulator, responsive to the input signal for generating a multiplicity of modulation control signals each corresponding to a respectively different one of the multiplicity of wavelength bands;

a multi-wavelength radiation source which provides a plurality of narrow-band radiation signals, each corresponding to a respectively different one of the multiplicity of wavelength bands, the radiation source being responsive to the multiplicity of control signals to control each narrow-band radiation signal in intensity to provide a multiplicity of modulated narrow-band radiation signals; and means for combining the modulated narrow-band radiation signals to display the color.

8. Apparatus according to claim 7, wherein the means for receiving the input signal representing respective intensities of a multiplicity of wavelength bands is configured to receive signals representing at least four wavelength bands.

9. Apparatus according to claim 7, wherein the means for receiving the input signal representing respective intensities of a multiplicity of wavelength bands is configured to receive signals representing at least seven wavelength bands.

10. Apparatus according to claim 7, wherein the multi-wavelength radiation source comprises:

a wide-band radiation source that provides radiation in a plurality of the multiplicity of wavelength bands; and a respective plurality of filters, coupled to receive radiation from the wide-band radiation source and configured to provide a respective plurality of the narrow-band radiation signals.

11. Apparatus according to claim 10, wherein at least one of the filters is a color selective etalon filter.

12. Apparatus according to claim 7, wherein the multi-wavelength radiation source comprises:

a plurality of narrow-band radiation sources, each providing a respective one of the narrow-band radiation signals.

13. Apparatus according to claim 12, wherein the plurality of narrow-band radiation sources include light emitting diodes (LEDs).

14. Apparatus according to claim 13, wherein the means for combining the modulated narrow-band radiation signals includes: a light pipe or a plurality of light pipes which branch into a single light pipe, each of the plurality of light pipes being coupled to a respectively different one of the LEDs, the single light pipe being coupled to a diffuser.

15. Apparatus according to claim 13, wherein the means for combining the modulated narrow-band radiation signals includes: a light pipe or a plurality of light pipes which branch into a single light pipe, each of the plurality of light pipes being coupled to a respectively different one of the LEDs, the single light pipe including a diffuser.

16. Apparatus according to claim 7, wherein the multi-wavelength radiation source further comprises a plurality of liquid crystal devices (LCDs), each of the plurality of LCDs being configured to be responsive to a respectively different one of the multiplicity of control signals to modulate the intensity of a respective one of the multiplicity of narrow-band radiation signals.

17. Apparatus according to claim 16, wherein the means for combining the modulated narrow-band radiation signals includes a display screen.

18. Apparatus according to claim 7, wherein the multi-wavelength radiation source further comprises a plurality of micro electro-mechanical (MEM) devices, each of the plurality of MEMs being configured to be responsive to a respectively different one of the multiplicity of control signals to modulate the intensity of a respective one of the multiplicity of narrow-band radiation signals.

19. Apparatus according to claim 18, wherein the intensity modulator generates, as the plurality of control signals, a plurality of pulse-width modulated control signals and the multi-wavelength radiation source is responsive to the pulse-width modulation control signals to selectively direct the radiation toward or away from a display device to modulate average intensity of the narrow-band radiation signal.

20. A method for displaying a selected one of a plurality of colors each of the plurality of colors being represented by a respective descriptor, each descriptor representing a respective combination of intensity values for a plurality of wavelength bands corresponding to the respective color, the method comprising the steps of:

receiving a color selection signal representing the selected one of the plurality of colors;

responsive to the color selection signal, retrieving one of the descriptors corresponding to the selected one of the plurality of colors;

providing a plurality of narrow-band radiation sources each radiation source corresponding to a respective one of the plurality of wavelength bands;

modulating the plurality of narrow-band radiation sources responsive to the respective intensity values of the retrieved descriptor to generate a plurality of modulated narrow-band radiation sources; and combining the plurality of modulated narrow-band radiation sources to reproduce the selected one of the plurality of colors.

21. A method according to claim 18, wherein each color is represented by a plurality of descriptors, each of the plurality of descriptors representing the color illuminated by a respectively different radiation source, wherein the step of receiving the color selection signal also receives a radiation source selection signal; and the step of retrieving one of the descriptors is responsive to the color selection signal and to the radiation source selection signal.

* * * * *